(12) United States Patent
Zawinsky

(10) Patent No.: US 12,523,091 B2
(45) Date of Patent: Jan. 13, 2026

(54) BUILDING ACCESS PANELS

(71) Applicant: Michael Lee Zawinsky, Houston, TX (US)

(72) Inventor: Michael Lee Zawinsky, Houston, TX (US)

(*) Notice: Subject to any disclaimer, the term of this patent is extended or adjusted under 35 U.S.C. 154(b) by 221 days.

(21) Appl. No.: 18/463,563

(22) Filed: Sep. 8, 2023

(65) Prior Publication Data

US 2024/0110436 A1 Apr. 4, 2024

Related U.S. Application Data

(63) Continuation-in-part of application No. 18/337,034, filed on Jun. 18, 2023.

(60) Provisional application No. 63/366,632, filed on Jun. 18, 2022.

(51) Int. Cl.
| | |
|---|---|
| *E06B 5/01* | (2006.01) |
| *E04B 9/00* | (2006.01) |
| *E05C 17/02* | (2006.01) |
| *E05F 1/10* | (2006.01) |
| *E06B 5/00* | (2006.01) |

(52) U.S. Cl.
CPC ............. *E06B 5/00* (2013.01); *E04B 9/003* (2013.01); *E05C 17/02* (2013.01); *E05F 1/1041* (2013.01); *E06B 5/01* (2013.01)

(58) Field of Classification Search
CPC ......... E06B 5/00; E06B 5/01; E05D 11/1014; E04B 9/003
See application file for complete search history.

(56) References Cited

U.S. PATENT DOCUMENTS

| | | | | |
|---|---|---|---|---|
| 794,968 | A * | 7/1905 | Baldwin | E06B 5/01 16/81 |
| 3,417,509 | A * | 12/1968 | Sherron | E06B 5/01 49/130 |
| 4,344,505 | A * | 8/1982 | Waters | E04F 11/064 182/47 |
| 4,591,022 | A * | 5/1986 | Sciambi | E06B 5/01 182/47 |
| 4,733,511 | A * | 3/1988 | Muth | E06B 5/01 49/213 |
| 10,329,812 | B1 * | 6/2019 | Hallsten | E04H 4/082 |
| 2009/0084039 | A1 * | 4/2009 | Guering | E05F 1/1066 49/109 |
| 2013/0232880 | A1 * | 9/2013 | Cook | E04B 9/003 49/463 |

* cited by examiner

*Primary Examiner* — Adriana Figueroa
(74) *Attorney, Agent, or Firm* — McAughan Deaver PLLC

(57) ABSTRACT

The access systems may comprise a frame that defines a first location in which the moveable panel resides when access to the covered or hidden devices is not needed and defines a second location in which the moveable panel resides when access to the covered or hidden devices is needed. Access may be provided through the first location.

12 Claims, 6 Drawing Sheets

BUILDING ACCESS PANELS

CROSS REFERENCE TO RELATED APPLICATIONS

This application claims benefit of and priority to U.S. patent application Ser. No. 18/337,034, filed on Jun. 18, 2023, United States provisional patent application no. 63/366,632, filed on Jun. 18, 2022, the entire contents of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present inventions are directed to access structures useful in building construction where the space (such as a plenum or chase) behind a finished or unfinished surface (such as a wall or ceiling) has limited depth.

Description of the Related Art

In building construction, such as, but not limited to commercial building construction, wall and ceiling systems often cover or hide other building components and systems, including electrical systems, HVAC systems, fire prevention systems, data systems and the like. Doors are often times built into the finished wall or ceiling systems to provide access to covered or hidden building components and other systems. These doors or access panels are either fire rated, or non-fire rated. A fire rated access panel typically must be self-closing and self-latching.

Conventional hinged access doors have a swing arc defined by the length of the door perpendicular to the hinge axis. For access doors that open into the space behind the wall or ceiling, the space has to have sufficient depth to accommodate the swing arc. For spaces with limited depth, the size of the door has to be reduced, which can adversely impact the access provided.

The present inventions are directed to access systems for spaces having limited depth yet providing adequate access to the hidden or covered systems.

It is to be understood that this description of the background is provided for illustrative purposes only and is not intended to and does not limit the scope or subject matter of the appended or ultimately issued claims or those of any related patent application or patent. Thus, none of the appended claims, ultimately issued claims or claims of any related application or patent are to be limited by the above discussion or construed to address, include, or exclude each or any of the above-cited features or disadvantages merely because such were mentioned as background.

BRIEF SUMMARY OF THE INVENTION

A brief, non-limiting summary of the inventions disclosed herein is an access panel system, comprising an elongated frame defining a first location and a second location. A first, movable wall or ceiling member may be disposed in the first location and a second wall or ceiling member may be disposed in the second location, such that the first and second wall or ceiling members reside in a common plane. A storage area defined by the frame may be located in the second location such that the storage area is not in the same plane as the first and second wall or ceiling members. The storage area may be dimensioned to store the first, movable wall or ceiling member when access through the first location is needed. An access system may further comprise a self-closing assembly that biases the first movable wall or ceiling member to the first location and into the common plane with the second wall or ceiling member. An access system may further comprise a hold open assembly having a first condition and a second condition, wherein the second condition holds the first movable wall or ceiling panel in the storage area, and the first condition allows the self-closing assembly to return the first movable wall or ceiling panel to the first location. An access system may further comprise a self-latching assembly that secures the first movable wall or ceiling member to the frame in first location and into the common plane with the second wall or ceiling member.

This brief summary of the inventions is not intended to limit or otherwise affect the scope of what has been disclosed and enabled or the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the disclosure of inventions and are included to further illustrate certain aspects of the inventions. The inventions and the many embodiments that may incorporate the inventios may be better understood by reference to one or more of these figures in combination with the detailed description of certain embodiments presented herein.

Figure 1:
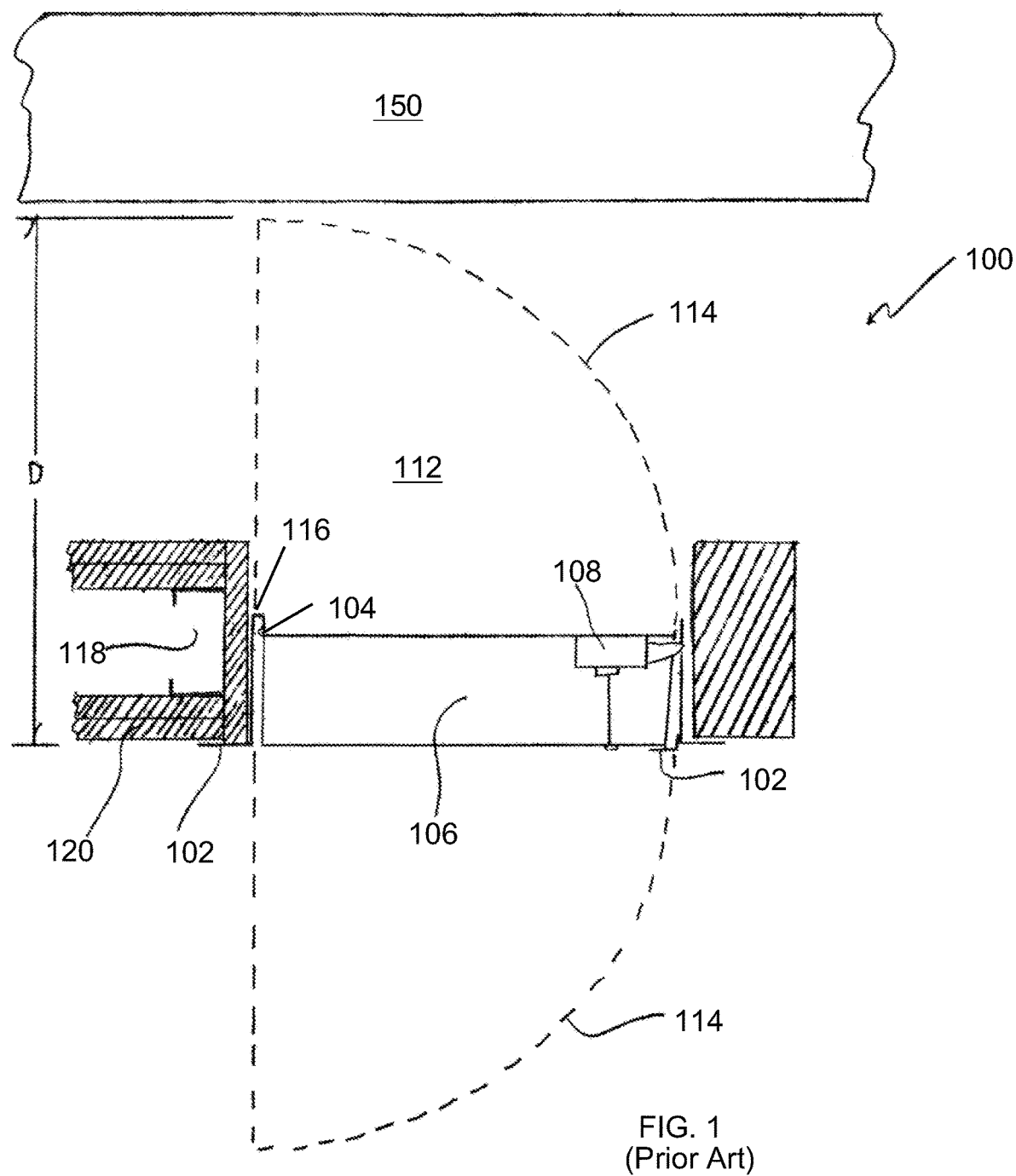
FIG. 1 illustrates a conventional fire-rated hinged access system.

While the inventions disclosed herein are susceptible to various modifications and alternative forms, only a few specific embodiments have been shown by way of example in the drawings and are described in more detail below. The figures and detailed descriptions of these embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts illustrated and taught by the specific embodiments.

DETAILED DESCRIPTION

The Figures described above, and the written description of specific structures and functions below, are not presented to limit the scope of the inventions disclosed or the scope of the appended claims. Rather, the Figures and written description are provided to teach a person skilled in this art to make and use the inventions for which patent protection is sought.

A person of skill in this art having benefit of this disclosure will understand that the inventions are disclosed and taught herein by reference to specific embodiments, and that these specific embodiments are susceptible to numerous and various modifications and alternative forms without departing from the inventions we possess. For example, and not limitation, a person of skill in this art having benefit of this disclosure will understand that Figures and/or embodiments that use one or more common structures or elements, such as a structure or an element identified by a common reference number, are linked together for all purposes of supporting and enabling our inventions, and that such individual Figures or embodiments are not disparate disclosures. A person of skill in this art having benefit of this disclosure immediately will recognize and understand the various other embodiments of our inventions having one or more of the structures or elements illustrated and/or described in the various linked embodiments. In other words, not all possible embodiments of our inventions are described or illustrated in this application, and one or more of the claims to our inventions may not be directed to a specific, disclosed example. Nonetheless, a person of skill in this art having benefit of this disclosure will understand that the claims are fully supported by the entirety of this disclosure.

Those persons skilled in this art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

Reference throughout this disclosure to "one embodiment," "an embodiment," or similar language means that a particular feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. In the following description, numerous specific details are provided, but those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

The description of elements in each Figure may refer to elements of proceeding Figures. Like numbers refer to like elements in all figures, including alternate embodiments of like elements. In some of the many possible embodiments, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved. Also, the use of relational terms, such as, but not limited to, "top," "bottom," "left," "right," "upper," "lower," "down," "up," "side," and the like are used in the written description for clarity in specific reference to the Figures and are not intended to limit the disclosure of the invention or the scope of what is claimed.

I have invented access systems for building construction in which the movable panel or door is not hinged to a frame and, therefore, does not have a swing arc. The access systems may comprise a frame that defines a first location in which the moveable panel resides when access to the covered or hidden devices is not needed and defines a second location in which the moveable panel resides when access to the covered or hidden devices is needed. Access may be provided through the first location.

The access system may optionally comprise a latch assembly that releasably secures or fixes the access or movable panel in the first location or a self-latching assembly that automatically releasably secures or fixes the moveable panel in the first location. The access systems may optionally comprise a self-closing assembly that automatically moves (such as translates or slides) the moveable panel from the second location back into the first location. The access systems may optionally comprise a hold open assembly that releasably secures or fixes the movable panel in the second location while access to the space is needed.

The access systems may be installed horizontally, such as in a ceiling system, or vertically, such as in a wall system. In vertical installations, gravity may be used to move or to assist in moving the movable panel back to the first position.

In operation, the movable panel initially will be in the first location within the access system. To gain access to the hidden or covered space, a user will deactivate the self-latching assembly (if utilized). The user will then move the movable panel into the space (or in the direction of the space) until the movable panel translates, such as slides, or is moved into the second location, such as a pocket. Once the movable panel is in the second location or pocket, a hold open assembly or component may be activated to hold the movable panel in the second location, such as when a self-closing assembly is provided, or when the movable panel is moved in vertical direction to gain access. The user can then access the covered or hidden space through the first location in the access system. When access to the space is no longer needed, the user may deactivate the hold open assembly (if utilized). The access panel will then automatically move back to the first location when a self-closing assembly is provided. Alternately or additionally, the user or gravity can move the movable panel back to the first location and either latch the panel in place or the panel will automatically latch in place when a self-latching assembly is provided.

Turning now to the Figures, FIG. 1 illustrates a conventional hinged access panel system 100 having a frame 102 a hinge 104, such as a piano hinge, an insulated or fire-rated door 106, and a latch assembly 108. The latch assembly 108 may have an external mechanism 110, such as a hex socket screw, for deactivating the latch 108 to open the door 106. The access system 100 typically has a stop 116 that prevents the door 106 from opening past 89° or 90°. In this way, gravity can assist in closing and latching the door. It will be appreciated that as the door 106 opens it rotates into the space 112 tracing the arc 114. This requires that the space 112 have a depth "D" to accommodate the swing arc 114 of the door. The space depth D decreases the size of the door 106, and therefore the access opening, must also be decreased. Other hinged access panels may have a downward swing, which downward swing may determine the size of the allowed opening.

Figure 2:
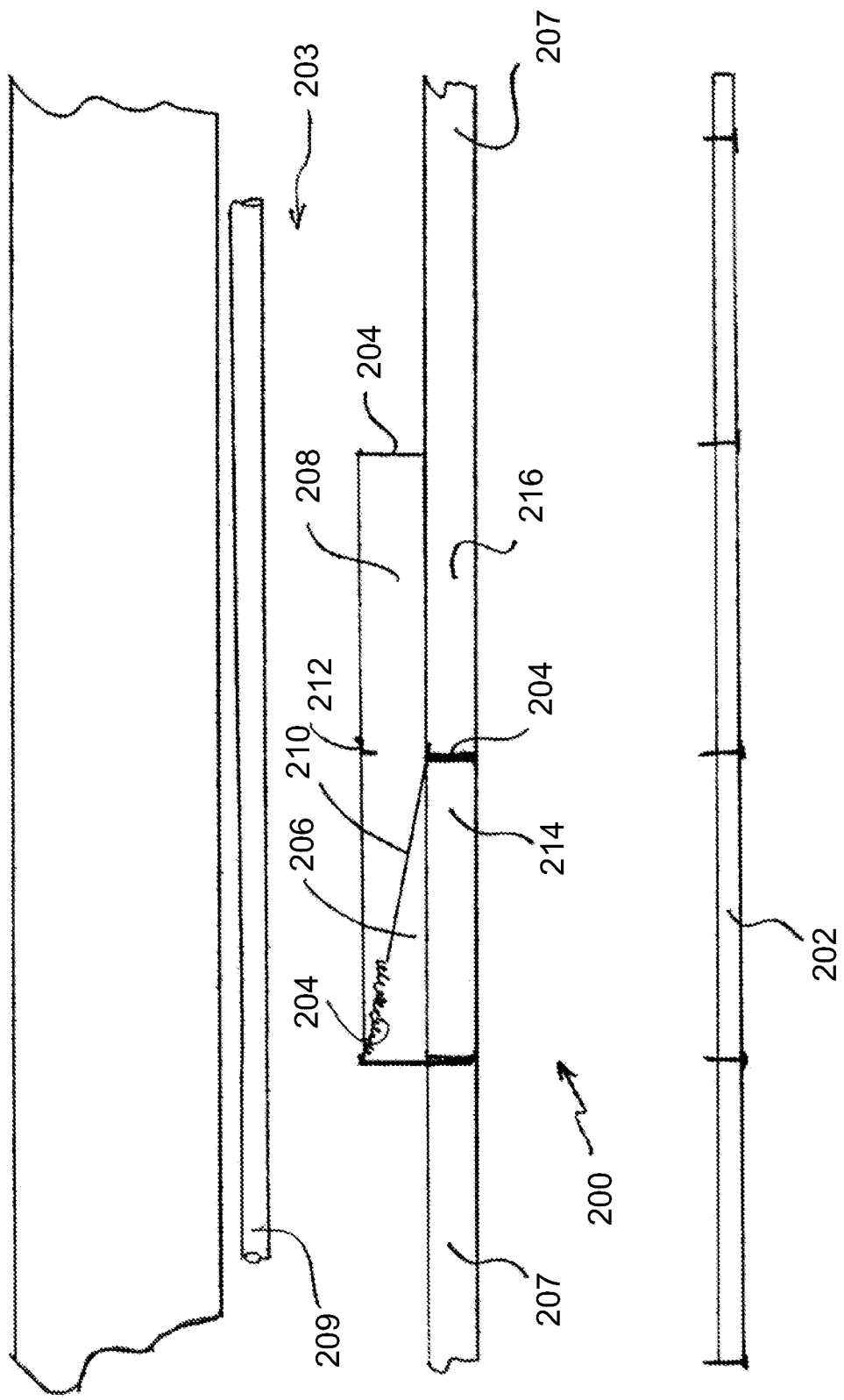
FIG. 2 illustrates an access system according to the present inventions as may be utilized to access a space or chase having mechanical, electrical, data, plumbing, or other building infrastructure systems.

FIG. 2 illustrates an embodiment of an access system 200 incorporating aspects of the disclosed inventions disposed above a suspended ceiling system 202 and below a chase or plenum 203 and within a fire-rated or non-rated ceiling system 207. Also shown for illustrative purposes is an infrastructure system 209 to which access is provided by access panel 200. While this particular embodiment is horizontally disposed in a ceiling system 207, such as between an occupied space below the suspended ceiling 202 and the building infrastructure systems 209, those persons of skill in this art having benefit of this disclosure will be enabled to make and use access systems that can be disposed horizontally or vertically in wall and ceiling systems, whether fire-rated or not.

As illustrated in FIG. 2, the access system 200 may comprise a frame or body 204 that defines a first location 206 and a second location 208, an optional self-closing assembly 210, and an optional hold open assembly 212. A first panel 214 is movably disposed in the first location 206, and an optional second panel 216 may be fixedly disposed in the second location 208. It will be understood second panel 216 does not have to be a separate or distinct element from the surrounding rated or non-rated ceiling system 207. In this embodiment 200, the second panel (or portion of ceiling 207) 216 may be secured to the frame 204 in the second location 208. It will be understood that when the first panel 214 is in the first location 206 and the second panel 216 is in the second location 208, the appearance of the access system 200 is effectively indistinguishable from the surrounding ceiling system 207, except for perhaps a delatching mechanism 220 (not shown in FIG. 1) associated with the first tile 214.

Figure 3:
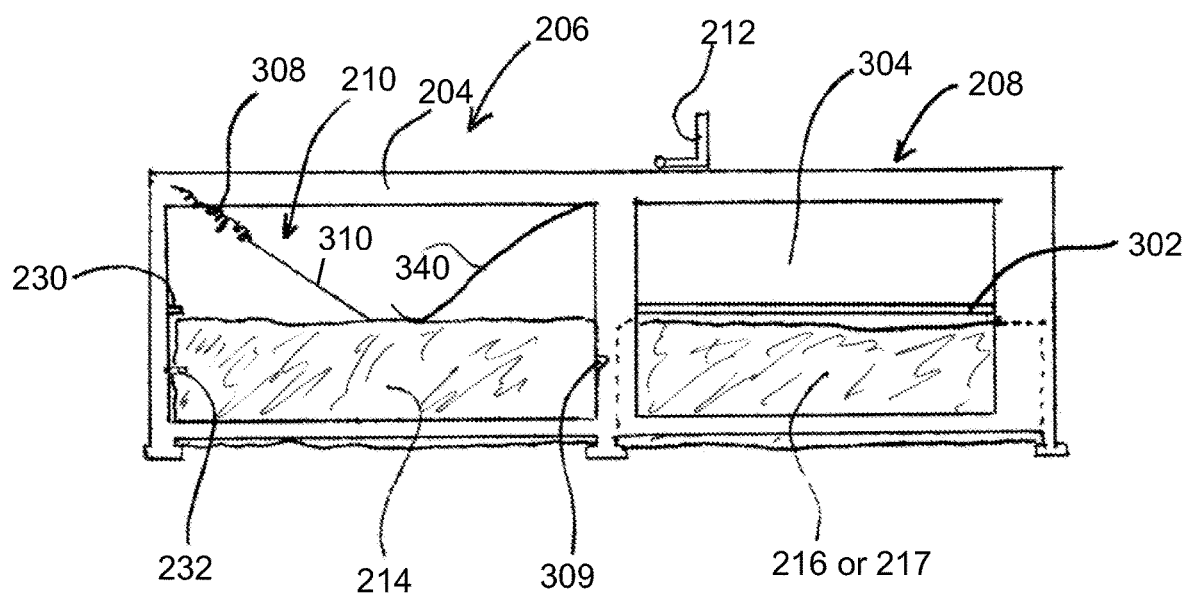
FIG. 3 illustrates a side view of an access system according to the present inventions in which the movable panel is in the first position.
Figure 4:
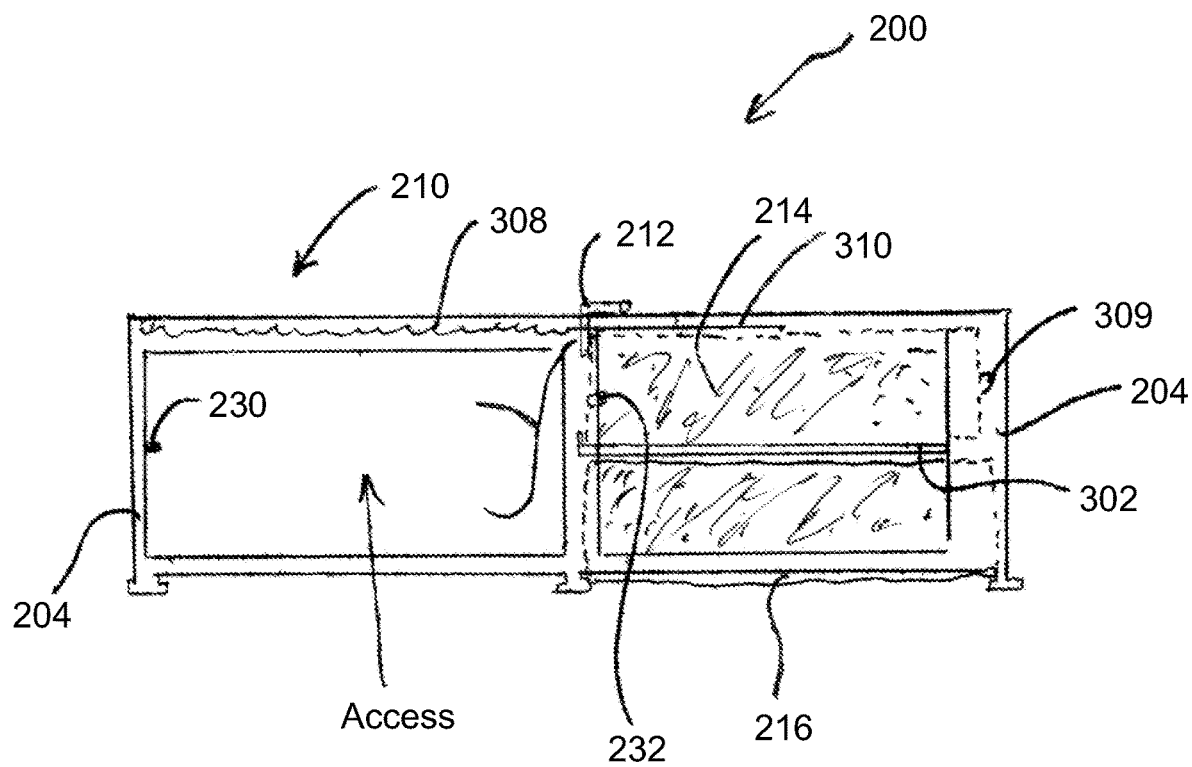
FIG. 4 illustrates a side view of an access system according to the present inventions in which the movable panel is in the second position.

FIG. 3 illustrates a side view of the access system 200 in the secured or closed condition, and FIG. 4 illustrates a side view of the access system 200 in the opened or accessed condition. The frame or body 204 illustrated in these figures is different from the body illustrated in FIG. 2 to teach those of skill that the frame or body may have different forms or shapes depending on the requirements of the particular implementation. The frame or body 204 may be an open frame or a closed frame, or a combined opened and closed frame or body. These figures show the frame 204, which is preferably fabricated from metal, such as sheet metal, wood, plastic, or a composite material, such as fiberglass or carbon fiber. The frame 204 defines the first location 206 and the second location 208. In FIG. 3, the movable panel 214 is shown disposed and secured by latch 309 in the first location 206. The movable panel 214 also may be secured in position 206 by a lip or flange 230 and/or by one or more press-fit spring plungers 232 operatively coupled between the panel 214 and frame 204. The fixed panel 216 or ceiling system 207 is shown in the second location 208. Above the fixed panel 216 or ceiling system 207 the access system 200 may comprise one or more guides 302 such as flat or round bars or a flat sheet. When the movable panel 214 is unsecured from the first location and lifted up, the movable panel 214 can be moved into the movable panel storage location 304 and access to space or chase 306 may be had through the first location 206. Unlike conventional access systems 100 the depth required by the access system 200 is not defined by the width of length of the movable panel 214 because the movable panel slides horizontally (in this embodiment) rather than rotates into the space 306.

For those applications that require a self-closing function, a self-closing assembly 210 may be incorporated between the frame 204 and the movable panel 214. FIGS. 3 and 4 illustrate a first type of self-closing assembly 210 comprising a spring 308 and a cable 310. The spring/cable assembly 210 may be attached to the frame 204 in the first location and the movable panel 214 in such manner that the spring/cable assembly biases or pulls the movable panel 214 from the storage area 304 back into the first location. While FIG. 2 illustrates one self-closing assembly 210 centrally located on the movable panel 214, it will be appreciated that a plurality of self-closing assemblies may be used, such as, for example, two spring/cable assemblies with each one located at the outer edges of the movable panel 214. In such embodiments, the self-closing assemblies 210 would have minimal interference with the access opening when the movable panel 214 is in the storage area 304. While a combination spring 308 and cable 310 are disclosed, it will be appreciated that a spring 308 without a cable 310 may be used as the self-closing assembly 210. Also shown in FIGS. 3 and 4 is an optional second biasing system 340, such as a flat spring in which one end is secured to the frame 204 and the other end contacts the panel 214 when panel 214 is in the first location 206. It will be understood that this optional second biasing system aids the self-closing function of access panel 200.

Also shown in FIGS. 3 and 4 is an optional hold open assembly 212 (such as for non-rated access panels) comprising an L-shaped tang and a hinge. In the normal condition, the hold open assembly 212, is positioned such that it does not interfere with moving the panel 214 into the storage area 304 (FIG. 3). When the panel 214 is disposed in the storage area, the hold open assembly 212 can be rotated about the hinge into position (FIG. 4) so that the panel 214 is retained or held and the access point held open while access to the space 306 is needed. Other types of hold open assemblies are contemplated, such as, a drop pin or pins or a lip on the guides 302.

Also shown in FIGS. 3 and 4 is a self-latching assembly 309, such as a retractable bolt and socket. The bolt can be shaped and oriented such that a release key must be activated from space 218 to retract the bolt and lift the panel 214. Alternately, the bolt can be shaped and oriented such that upwards force on the panel 214 is sufficient to cause the bolt to retract.

Figure 5:
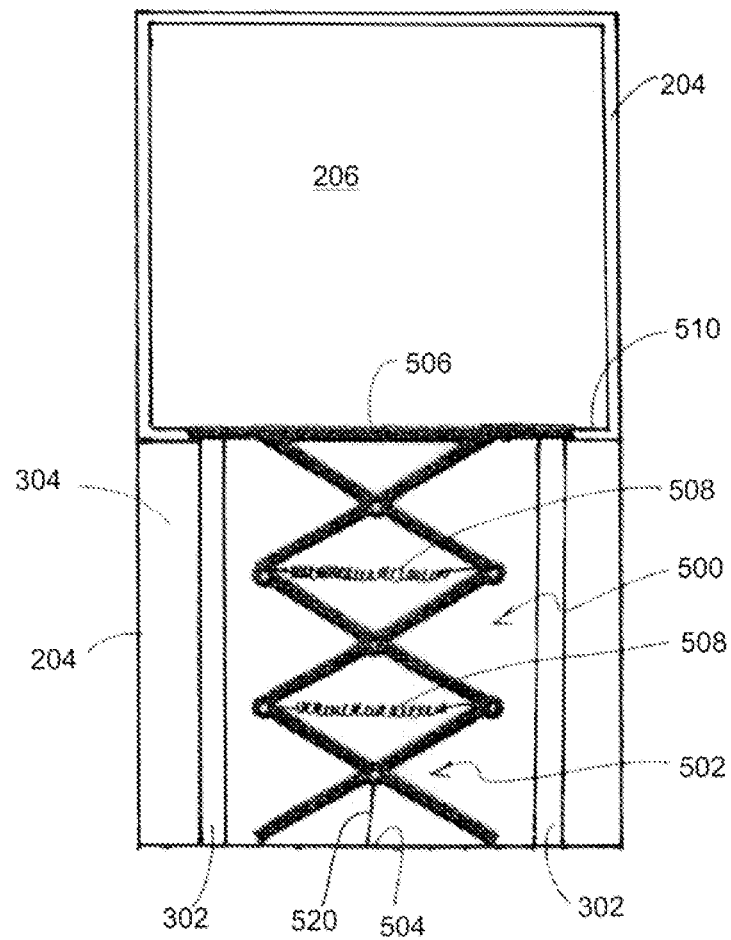
FIG. 5 illustrates an alternate self-closing assembly for use with access systems according to the present inventions.

Other types of self-closing assemblies that bias the movable panel 214 to the first location 206 may be used. For example, FIG. 5 illustrates a spring biased scissor mechanism 500, which may comprise one or more scissor sections 502. The scissor mechanism illustrated in FIG. 5 comprises a plurality of scissor sections. One end of the scissor mechanism 500 may be operatively coupled (such as through rollers) to back wall 504 of the frame 204 in the storage area 304 and the other end operatively coupled to a pusher plate 506 that can slide along the guide(s) 302. One of more of the scissor sections 502 may have a biasing element 508, such as a spring that biases the pusher plate to the extended position shown in FIG. 5. An extension limiting device 520, such as a cable or chain can be used to limit the extension of the self-closing assembly. Other types of extension limits, such as a lip or detent on the frame 204. In the biased condition, the scissor mechanism 500 is extended such that the pusher plate(s) 506 are at the interface 510 between the first 206 and second 208 locations. When access to the space 306 is desired, the movable panel 214 (not shown in FIG. 5) can be lifted up so that one end engages the pusher plate(s) 506. The movable panel 214 can be slid into the storage area 304 by compressing or retracting the scissor mechanism 500. A detent in the scissor mechanism 500, such as in the back wall 504 can hold the scissor mechanism 500 in the compressed state while access to the space 306 is needed. The detent can be overcome by additional movement of the movable panel 214. Once the detent is overcome, the biasing component 508, such as a spring, will extend the scissor mechanism thereby sliding the movable panel along the guides 302 until the movable panel 214 slides from the storage area 304 into the first location 206 thereby automatically closing the access.

Figure 6:
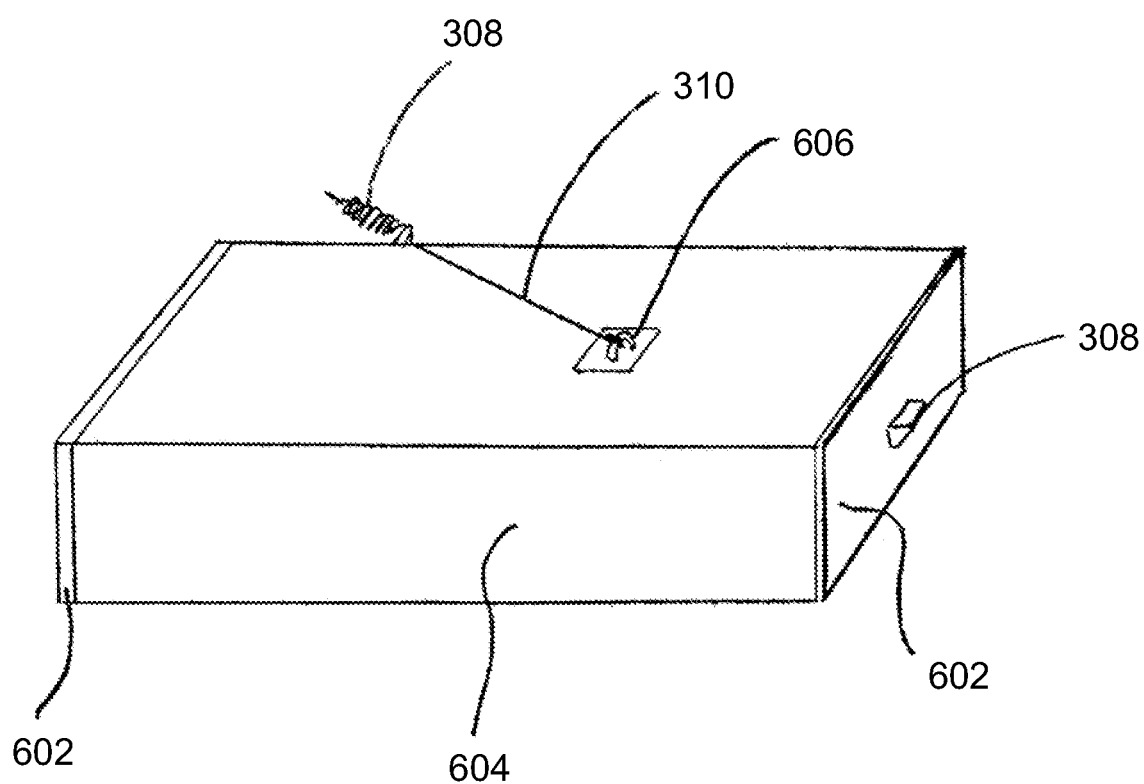
FIG. 6 illustrates a reinforced movable panel for use with access systems according to the present inventions.

More complex self-closing assemblies may be employed, including those that both lift and slid the movable panel 214 from the first location into the storage area 304 and back to the first location Depending on the application of the access system, the panels 214 and/or 216 may be insulated or fire-rated. FIG. 6 illustrates an insulated panel 604 with end reinforcements 602. The reinforcement is preferably metal, such as sheet metal, and serves to protect the insulated panel 604 from being damaged during repeated movement within the access system frame 204. The reinforcement 602 also may comprise a full edge frame surrounding the panel 604. Also shown in FIG. 6 is an attachment plate 606 for the self-closing assembly 210.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims, in which the use of a singular term, such as, but not limited to, "a," is not intended as limiting of the number of items.

What is claimed:

1. An access panel system, comprising:
   a frame defining a first location and a second location, the first location abutting the second location;
   a first, movable panel disposed in the first location and at least a portion of the first movable panel engaging the frame;
   a storage area defined by the frame in the second location such that the storage area is not in the same plane as defined by the first movable panel in the first location, wherein the storage area is dimensioned to store the first movable panel when access through the first location is needed; and
   a first biasing mechanism comprising at least one spring operationally coupled between the frame and the first movable panel, the first biasing mechanism configured to produce a force biasing the first movable panel from the second location to the first location.

2. The system of claim 1, further comprising a hold open assembly having a first condition and a second condition, wherein the second condition holds the first panel in the storage area against the biasing force created by the first biasing mechanism, and the first condition allows the first biasing mechanism to bias the first panel to the first location.

3. The system of claim 1, further comprising a self-latching assembly that secures the first panel to the frame in the first location.

4. The system of claim 1, further comprising a second biasing mechanism comprising a flat spring one end of which is coupled to the frame, and another end of which contacts the first movable panel in the first location, but does not contact the first movable panel in the second location, to produce a force to bias the first movable panel to the first location.

5. The system of claim 1, wherein the first movable panel comprises fire rated material.

6. The system of claim 1, wherein the first movable panel has reinforced edges to minimize wear to the first movable panel as it is transitioned to and from first location.

7. A method of accessing a region with the system of claim 1, comprising:
   moving the first movable panel from the first location into the storage area against the first biasing mechanism;
   accessing the region through the first location;
   returning the first panel to the first location using the first biasing mechanism force.

8. An access panel system, comprising:
   a frame defining a first location and a second location, the first location abutting the second location and defining a first plane;
   a storage area defined by the frame in the second location such that the storage area is not in first plane defined by the first location;
   a first panel disposed in the first location and movable from the first location to the storage area, the first panel comprising a self-latching mechanism that releasably secures the first panel to the frame in the first location;
   a first biasing mechanism comprising at least one spiral spring operationally coupled between the frame and the first panel and configured to produce a force biasing the first panel from the second location to the first location; and a retention device coupled to the frame and changeable between first and second states, such that the second state holds the first panel in the storage area against the first biasing mechanism force.

9. The system of claim 7, further comprising a second biasing mechanism comprising a flat spring one end of which is coupled to the frame, and another end of which contacts the first panel in the first location, but does not contact the first panel in the second location, structurally configured to produce a force to bias the first panel to the first location.

10. The system of claim 7, wherein the first movable panel is made of fire rated material.

11. The system of claim 7, wherein the first movable panel has reinforced edges to minimize wear to the first movable panel as it is transitioned to and from first location.

12. A method of accessing a region with the system of claim 7, comprising:
 moving the first movable panel from the first location into the storage area against the first biasing mechanism;
 changing the retention device from the first state to the second state to retain the first panel in the storage area;
 accessing the region through the first location;
 changing the retention device from the second state to the first state; and
 returning the first panel to the first location using the first biasing mechanism force.

* * * * *